United States Patent [19]
Parkins et al.

[11] Patent Number: 5,970,813
[45] Date of Patent: Oct. 26, 1999

[54] DRIVE SYSTEM

[75] Inventors: David G. Parkins, Ft. Lauderdale; John D. Meehan, Sarasota, both of Fla.

[73] Assignee: ABL Boat Lifts, Fort Meyers, Fla.

[21] Appl. No.: 08/932,035

[22] Filed: Sep. 17, 1997

[51] Int. Cl.$^6$ .............................. B63B 23/48; F16H 1/16
[52] U.S. Cl. .............................. 74/425; 114/51; 114/366; 254/343
[58] Field of Search .............................. 74/425; 114/51, 114/365, 366; 254/343; 384/428, 438, DIG. 905

[56] References Cited

U.S. PATENT DOCUMENTS

| | | | |
|---|---|---|---|
| 3,072,931 | 1/1963 | MIller et al. | 114/363 |
| 3,715,932 | 2/1973 | Sharp | 74/425 |
| 3,788,607 | 1/1974 | Crooks | 254/186 |
| 3,985,407 | 10/1976 | Oliver et al. | 384/276 |
| 4,084,447 | 4/1978 | Dalton | 74/425 |
| 4,226,136 | 10/1980 | Porter et al. | 74/425 |
| 4,644,812 | 2/1987 | Nelson | 74/425 |
| 4,665,763 | 5/1987 | James | 74/425 |
| 5,020,463 | 6/1991 | Franklin et al. | 114/230 |
| 5,287,821 | 2/1994 | Godbersen | 114/44 |
| 5,404,965 | 4/1995 | Michel | 74/425 |
| 5,772,360 | 6/1998 | Wood, II | 405/3 |
| 5,794,919 | 8/1998 | Hauck | 254/343 |

FOREIGN PATENT DOCUMENTS

| | | | |
|---|---|---|---|
| 631068 | 12/1994 | European Pat. Off. | 74/425 |
| 7407458 | 2/1975 | Netherlands | 74/425 |

OTHER PUBLICATIONS

Spiral and Worm Gearing, The Machinery Publishing Co., The Industrial Press, First Edition, pp. 176 and 191, 1914.

*Primary Examiner*—Tamara L. Graysay
*Assistant Examiner*—William C Joyce
*Attorney, Agent, or Firm*—Taylor Russell & Russell, P.C.

[57] ABSTRACT

A flat plate drive system for controlling the axial rotational motion of a drive shaft for raising and lowering a load, that optimizes frictional engagement while maximizing heat dissipation away from the moving parts of the drive system. The drive system can be generally used for raising and lowering many types of heavy loads, and is particularly suited for loads that are supported by a cable attached to one end of the drive shaft, with the cable extending through a cradle beam which supports a heavy object, such as a boat. The drive system comprises a worm connected to a source of rotational power. The worm frictionally engages a worm gear wheel that axially rotates a drive shaft. The worm and worm gear wheel are connected to a backplate support. The system maximizes the friction between the worm and worm gear wheel. The system also maximizes the transfer of heat generated by the frictional engagement of the worm and worm gear wheel away from the worm and worm gear wheel to other parts of the drive system, particularly the backplate which is composed of a high thermal conductivity material.

22 Claims, 3 Drawing Sheets

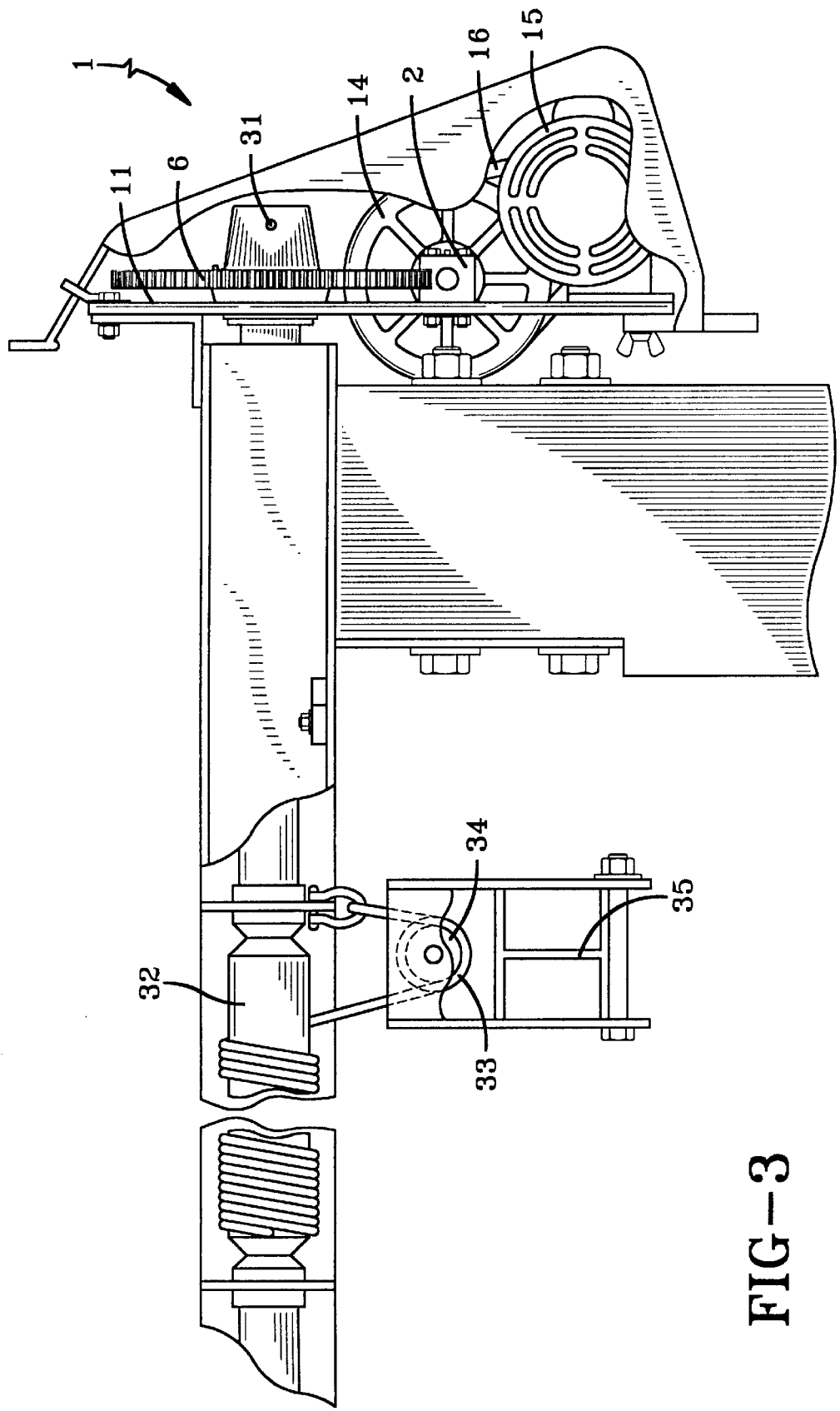

DRIVE SYSTEM

BACKGROUND

The invention relates generally to a drive system and, more particularly, to a flat plate drive for controlling the axial rotational motion of a drive shaft for raising and lowering a load, that optimizes frictional engagement while maximizing heat dissipation away from the moving parts of the drive system. The drive system can be generally used for raising and lowering many types of heavy loads, and is particularly suited for loads that are supported by one or more cables attached to the drive shaft, with the cable extending through a cradle beam which supports a heavy object, such as a boat.

In normal operation, drive systems for lifting boats are usually attached to pilings. The drive system is connected to a drive shaft which runs between the pilings. The cables are attached to the drive shaft, extend through a cradle beam which supports the load, such as the hull of the boat, and are connected on the other end to the lift frame. The drive system allows for the drive shaft to be rotated in either a clockwise or counterclockwise position so as to be able to raise or lower the load.

Existing flat plate drives use an electric motor with a drive belt. The drive belt usually drives a pulley mounted on a thin shaft which carries a worm. The worm drives a toothed cast steel worm gear wheel, which in turn drives a drive shaft. These components are mounted on a backplate which is bolted into place to counteract the torque action of the drive. The load is raised, lowered and held in place by the frictional contact of the worm against the worm gear wheel and the worm bearings. This frictional contact between the worm and the worm gear wheel and the worm bearings causes excessive heat to build up in this area, which increases the temperature. This increase in temperature can cause the worm, worm gear wheel and bearings to wear excessively and to warp and bend as well.

Other drive manufacturers have attempted to solve the problem of excessive heat buildup and gear wear by using anti-friction thrust bearings at the worm and using lubricants retained at the worm. However, the heat buildup often causes the lubricant to break down and no longer be effective. Others have experimented with the use of high temperature lubricants. However, in addition to decreasing friction, the lubricant can act as a heat insulator, limiting the transfer of heat away from the worm and worm gear wheel. These attempts have concentrated on solving the excessive heat build up and wear of the gears by reducing friction. All of these attempted solutions reduce friction and lessen the contact between the worm gear and the drive gear wheel. So when the motor is stopped and the load is in the desired place, the system experiences what is called running back, or overrunning, so that the load continues to be lowered beyond its desired position. Several tries are often necessary to finally get the load in its desired position. This is especially a problem when trying to stop the drive during the lowering of the load and can also create safety problems.

For the foregoing reasons, there is a need, therefore, for a drive system that operates on the principle of friction, yet does not experience running back when raising and lowering a load, does not result in warping and bending of components due to excessive temperature generated as a byproduct of friction and does not require excessive lubricating that can limit the transfer of heat away from the components.

SUMMARY

The present invention is directed to a device and method that satisfies these needs. The present invention provides for a drive system that operates on the principle of friction, yet does not experience running back when raising and lowering a load, does not result in warping and bending of components due to excessive temperature generated as a byproduct of friction and does not require excessive lubricating that can limit the transfer of heat away from the components.

The present invention recognizes that since this type of drive system operates on the principle of friction, it is desirable to optimize friction, not reduce it by the use of anti-friction devices or lubricants, while at the same time reducing the temperature increase during operation of the drive due to friction's byproduct, heat.

The present invention dissipates the heat generated during operation of the drive in these fundamental ways: use of high thermal conductivity materials for key components within the drive system, location of those components within the system and connection of those components in such a way as to maximize heat dissipation away from the moving parts of the system.

In the present drive system, a worm composed of a high thermal conductivity material is connected to a source of rotational power. When power is applied, the worm shaft frictionally engages a worm gear wheel. The worm gear wheel, composed of a high thermal conductivity material, then in turn, axially rotates the drive shaft. The worm gear wheel and worm are connected to and supported by a backplate, also composed of a high thermal conductivity material. It is this frictional engagement of the worm and worm gear wheel and the worm and bearing blocks that generates heat within the drive system. However, in the present invention, the heat is dissipated away from the source of the heat to other parts of the drive system. This is accomplished by in part by the worm shaft and bearing blocks directly contacting each other, without the use of any sleeves. In addition, the bearing blocks are directly connected to and fit into a recess in the backplate of the same shape as the blocks, to provide a large surface connection for the transfer of heat directly to the backplate. Also, the worm gear wheel itself is directly connected to and fits into a recess formed in the backplate. The backplate, worm shaft and the bearing blocks may be made of aluminum. Use of high thermal conductivity materials, such as aluminum, that are in contact allows for superior heat dissipation and transfer.

The present invention optimizes friction while maximizing heat dissipation, which results in a more stable and self-locking system while allowing for the increased heat due to the friction to be dissipated quickly throughout the drive unit. This results in less wear on the system, less bending and warping of the components and improved operation. The amount of lubricant can be decreased and the frequency of the application of the lubricant can also be reduced since the lubricant does not break down as quickly with the reduction of temperature. This arrangement allows for better self-locking of the lift, that is little or no running back or overrunning of the lift when the motor is turned off and the load is in its desired position because the solution to the problem maximizes friction between the worm gear and the drive gear wheel.

A drive system for controlling the axial rotational motion of a drive shaft comprises a worm connected to a source of rotational power. The worm frictionally engages a worm gear wheel that axially rotates the drive shaft. The worm and worm gear wheel are connected to a backplate support. Means are provided for maximizing the friction between the worm and worm gear wheel. Means are also provided for maximizing the transfer of heat generated by the frictional engagement of the worm and worm gear wheel away from the worm and worm gear wheel through the drive system.

In an alternative embodiment, the means for maximizing the heat transferred away from the worm and worm gear wheel comprise a backplate and worm gear wheel composed of a material having a high thermal conductivity. The worm gear wheel has a fixed hub about its center which connects directly to and rests in a recess formed in the backplate, thereby transferring heat to the backplate. The worm has an axially rotatable worm shaft disposed within bearing blocks, with both the worm shaft and bearing blocks composed of a material having a high thermal conductivity and connected directly to each other so as to optimize heat transfer of the heat generated by the frictional engagement of the worm and worm gear wheel, to the bearing blocks. The bearing blocks are connected directly to and rest in a recess formed in the backplate, thereby transferring heat to the backplate.

In an alternative embodiment, the means for maximizing the friction between the worm and worm gear wheel is by increasing the ratio of the worm and worm gear wheel to at least about ninety to one (90:1).

In an alternative embodiment, the high thermal conductivity material of which the backplate is composed is aluminum.

In an alternative embodiment, the worm gear wheel comprises an axially rotatable circular disc having a rim, with means equally spaced about the rim for frictional engagement of a worm. The worm gear wheel has a connection at its center for receiving the drive shaft. The rim of the worm gear wheel is located at a right angle to the drive shaft and is composed of a material having a high thermal conductivity. A worm comprises an axially rotatable worm shaft with one or more spiral grooves about its center axis to form a worm of a depth sufficient to interlock with and frictionally engage the rim of the worm gear wheel. The worm shaft is disposed within bearing blocks. The worm shaft and bearing blocks are composed of a material having a high thermal conductivity and are contacting each other so as to optimize the dissipation of heat generated by the frictional engagement of the worm gear wheel and worm. The worm shaft and bearing blocks are located at a right angle to but not intersecting the drive shaft. A means for applying power is provided to rotate the worm shaft. When power is applied, the worm shaft then frictionally engages the worm gear wheel, causing the drive shaft to be rotated. The worm gear wheel and worm are removably connected directly to a backplate support which is composed of a material having a high thermal conductivity. When power is applied to rotate the worm, it frictionally engages the worm gear wheel, and heat generated by that frictional engagement is transferred away from the worm gear wheel and worm to the backplate support.

In an alternative embodiment, the worm shaft is directly connected to the bearing blocks, thereby transferring heat, generated by the frictional engagement of the worm gear wheel and worm, away from the worm gear wheel and worm to the bearing blocks. The bearing blocks are connected directly to and rest in a recess formed in the backplate. The connection at the center of the worm gear wheel for receiving the drive shaft is a fixed hub which connects directly to, and rests in a recess formed in the backplate, thereby transferring heat, generated by the frictional engagement of the worm gear wheel and worm, away from the worm gear wheel and worm to the backplate.

In an alternative embodiment, the worm shaft is a unitary piece so as to maximize the transfer of heat, generated by the frictional engagement of the worm gear wheel and worm, away from the worm gear wheel and worm to the bearing blocks and to the backplate.

In an alternative embodiment, the backplate assembly is an aluminum plate.

In an alternative embodiment, the aluminum plate of the backplate assembly is of a thickness of about one-half inch.

In an alternative embodiment, the worm and bearing blocks are aluminum.

In an alternative embodiment, the spiral grooves about the worm shaft are bronze.

In an alternative embodiment, the worm gear wheel is steel.

In an alternative embodiment, a drive shaft is connected to the worm gear wheel. The drive shaft is composed of a material having a high thermal conductivity so as to optimize the transfer of heat generated by the frictional engagement of the worm gear wheel and worm, away from the worm gear wheel and worm to the drive shaft.

In an alternative embodiment, the means spaced about the rim of the worm gear wheel for frictional engagement of the worm are teeth that extend radially outward about the rim and the grooves, about the center axis of the axially rotatable worm shaft form teeth that mesh with the teeth extending about the rim of the worm gear wheel.

In an alternative embodiment, the ratio of the teeth spaced about the rim of the worm gear wheel number to the spiral groove about the worm shaft is at least about ninety to one.

In an alternative embodiment, the worm gear wheel comprises an axially rotatable circular disc having a rim, with means equally spaced about the rim for frictional engagement of a worm and a connection at its center for receiving the drive shaft. The rim of the worm gear wheel is located at a right angle to the drive shaft and is composed of a material having a high thermal conductivity. The worm comprises an axially rotatable worm shaft with one or more spiral grooves about its center axis to form a worm of a depth sufficient to interlock with and frictionally engage the rim of the worm gear wheel. The worm shaft is disposed within bearing blocks. The worm and bearing blocks are composed of a material having a high thermal conductivity and are contacting each other so as to optimize the dissipation of heat generated by the frictional engagement of the worm gear wheel and worm. The worm shaft and bearing blocks are located at a right angle to but not intersecting the drive shaft. A means for applying power to rotate the worm shaft is provided, whereby the worm shaft then frictionally engages the worm gear wheel, causing the drive shaft to be rotated. The worm gear wheel and worm are removably connected directly to a backplate support which is composed of a material having a high thermal conductivity. When power is applied to rotate the worm, it frictionally engages the worm gear wheel, and heat generated by that frictional engagement is transferred away from the worm gear wheel and worm to the backplate support. The backplate support is attached to at least one support piling. A cable is affixed to the drive shaft, extending through a pulley connected to one end of two or more cradle beams that are located at a ninety degree angle to the drive shaft and support the bottom of a boat. When power is applied to the drive system to axially rotate the worm in a first direction, the worm frictionally engages the worm gear wheel, thereby turning the worm gear wheel which rotates the drive shaft and winds the cable around the drive shaft and thereby raises the boat. When power is applied to the drive system to axially rotate the worm in a second and opposite direction, the worm frictionally engages the worm gear wheel, thereby turning the worm gear wheel which rotates the drive shaft and unwinds the cable from the drive shaft and thereby the boat is lowered. When power is no longer applied to the drive system, the worm locks the worm gear wheel in place using frictional engagement and stops the vertical movement of the boat, the frictional engagement being sufficient to prevent vertical movement of the boat.

In a method for optimizing frictional engagement while maximizing heat dissipation in a drive system for controlling the axial rotational motion of a drive shaft, the steps are: connecting a worm composed of a high thermal conductivity material to a source of rotational power; frictionally engaging the worm to a worm gear wheel composed of a high thermal conductivity material, that axially rotates the drive shaft; connecting the worm and worm gear wheel to a backplate composed of a material having a high thermal conductivity; connecting the worm gear wheel having a fixed hub about its center directly to, and resting in a recess formed in the backplate, thereby transferring heat to the backplate; connecting the worm, which comprises an axially rotatable worm shaft connect to and disposed within bearing blocks, directly to the backplate by means of the bearing blocks that rest in a recess formed in the backplate; and applying power to rotate the worm, whereby the worm then frictionally engages the worm gear wheel causing the drive shaft to be rotated, whereby the heat generated by the frictional engagement of the worm gear wheel and the worm is transferred to the backplate.

In an alternative method, the steps comprise connecting the worm gear wheel to a drive shaft which is composed of a material having a high thermal conductivity and in the applying power step the heat generated is transferred to the drive shaft and the backplate.

In an alternative embodiment, a fitting for accepting a lubricant extending through a first surface of the circular disc of the worm gear wheel that faces away from the backplate.

In an alternative embodiment, the direct connection of the worm gear wheel is by a hub in the center of the worm gear wheel which connects to and rests in a recess formed in the backplate is retained by means of a positive retention snap ring attached to the backplate.

In an alternative embodiment, the direct connection of the bearing blocks to the backplate is by means of fitting the bearing blocks into a recess of the same shape as the bearing blocks to provide a large surface connection for the transfer of heat directly to the backplate.

In an alternative embodiment, the worm gear wheel and bearing blocks fit into a recess in backplate which assures correct alignment of the drive system.

In an alternative embodiment, the spiral grooves are fastened directly to and secured to the axially rotatable worm shaft by a locking device.

In an alternative embodiment, the means for applying power is a motor with a horsepower rating of between about one-quarter horsepower and about five horsepower.

BRIEF DESCRIPTION OF THE DRAWINGS

These and other features, aspects, and advantages of the present invention will become better understood with regard to the following description, appended claims, and accompanying drawings where:

FIG. 3 shows a perspective view of the drive system installed on pilings for lifting a boat embodying features of the present invention.

DETAILED DESCRIPTION

Figure 1:
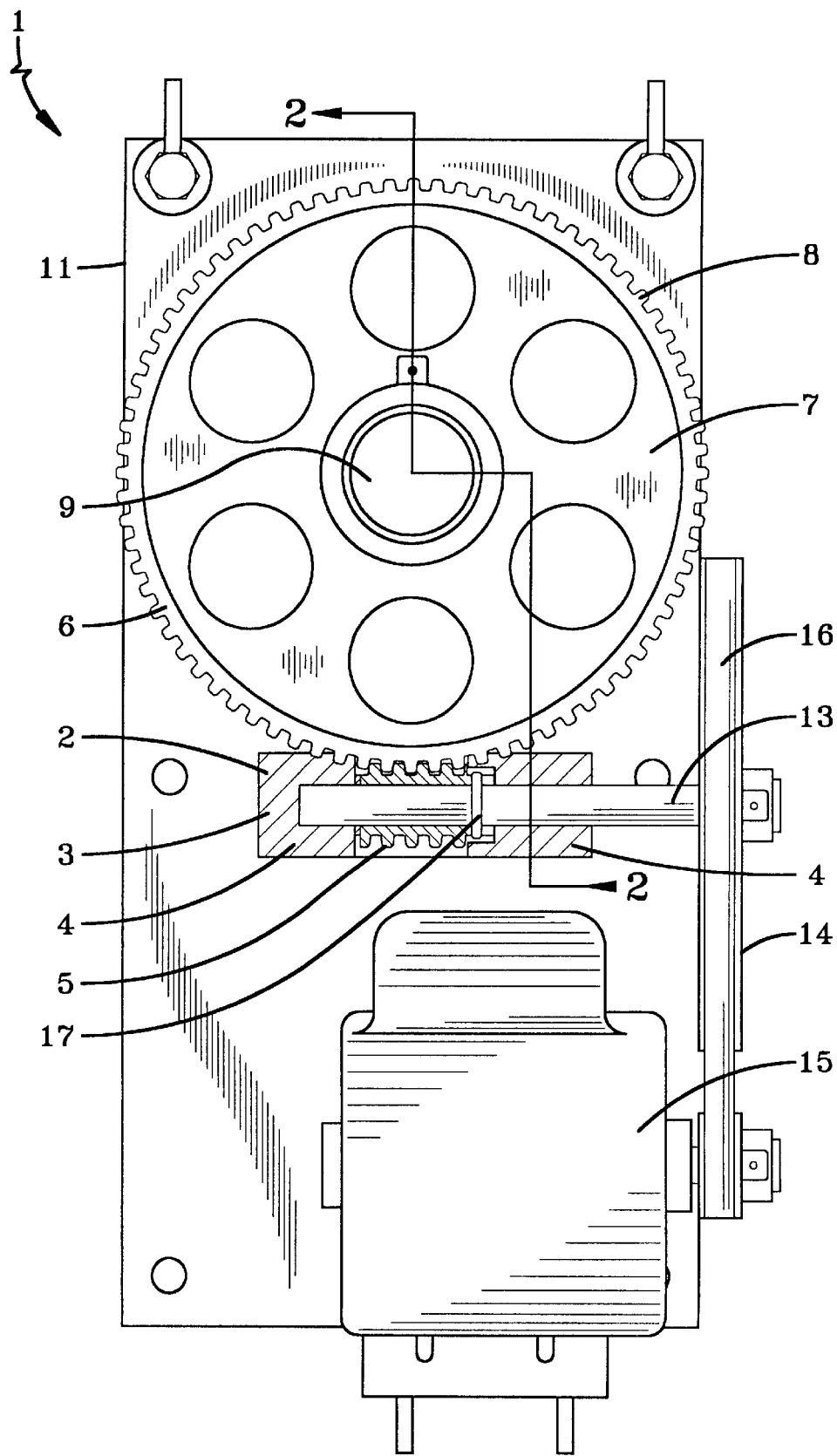
FIG. 1 shows a cross section of the drive system embodying features of the present invention.

Turning now to FIG. 1, a preferred embodiment of the drive system 1 is shown in accordance with the present inventive concepts.

The drive system 1 includes a worm 2 including an axially rotatable worm shaft 3 disposed within bearing blocks 4. The worm shaft 3 has spiral grooves 5 about its center axis to form a worm of a depth sufficient to interlock with and frictionally engage the worm gear wheel 6. The worm gear wheel 6 has an axially rotatable circular disc 7 with a rim 8 and has a connection its center 9 for receiving a drive shaft. The rim 8 of the circular disc 7 of the worm gear wheel 6 is located at a right angle to a drive shaft (see FIG. 3). Spaced about the rim 8 are teeth for frictionally engaging the grooves 5 of the worm 2. The worm shaft 3 and its spiral grooves 5 may be one piece or the spiral grooves 5 of the worm 2 may be directly bolted to and secured to the worm shaft 3 by a locking device 17. One end 13 of the worm shaft 3 is connected to a pulley wheel 14. A pulley belt 16 connects the pulley wheel 14 to a motor 15 which provides a source of rotational power. The worm gear wheel 6, worm 2, pulley wheel 14 and motor 15 are mounted on and supported by a backplate 11. The worm gear wheel 6, the worm shaft 3, the bearing blocks 4 and backplate 11 are composed of a material having a high thermal conductivity.

Figure 2:
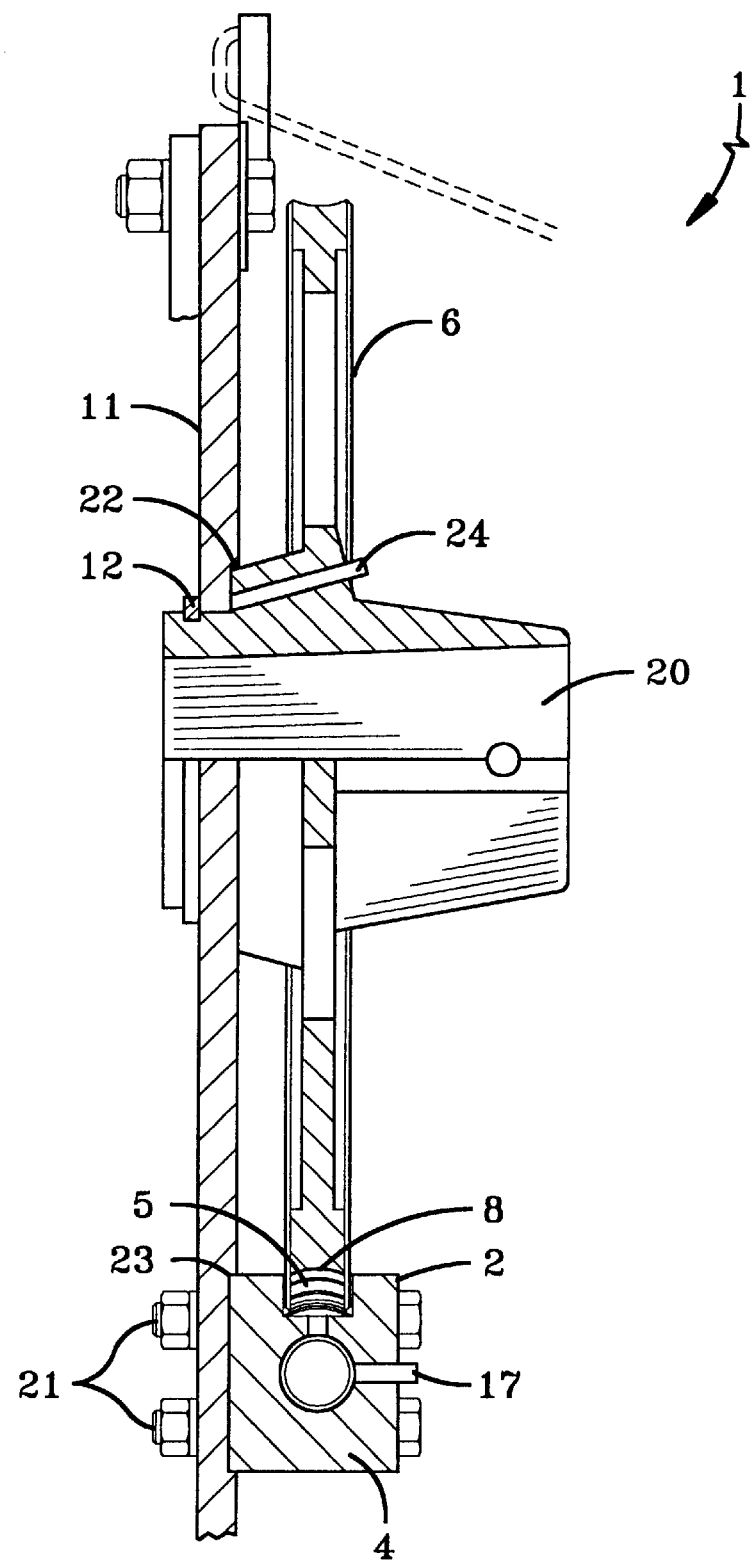
FIG. 2 shows a cross section of the drive system taken substantially along line 2—2, embodying features of the present invention.

Turning now to FIG. 2, a preferred embodiment of the drive system I is shown in accordance with the present inventive concepts. The connection at the center 9 of worm gear wheel 6 is a fixed hub 20 for accepting a drive shaft. The worm gear wheel 6 connects directly to and rests in a recess 22 formed in a backplate 11 and is held in place by means of a positive retention snap ring 12. The spiral grooves 5 engage the rim 8 of the worm gear wheel 6. If the worm shaft 3 (shown in FIG. 1) and spiral grooves 5 are not unitary, a locking device 17 may be used to secure the spiral grooves 5 to the worm shaft 3. The bearing blocks 4 of the worm 2 connect directly to and rest in a recess 23 formed in the backplate 11 and are held in place by bearing block bolts 21. A lubricant fitting 24 extends through the worm gear wheel 6.

Turning now to FIG. 3, a preferred embodiment of the drive system 1 is shown in accordance with the present inventive concepts. The drive system 1 is shown for lifting a load such as a boat. The drive system 1 has a motor 15 mounted to the backplate 11. The motor 15 is connected via a pulley belt 16 to a pulley wheel 14 which is connected to the worm 2. The worm 2 frictionally engages the circular rim 8 of the worm gear wheel 6. The drive shaft 32 is connected to the worm gear wheel 6 and is secured by a drive gear bolt 31. A cable 33 is affixed to the drive shaft 32 and extends through one or more pulleys 34 connected to the end of a cradle beam 35 that are located a a ninety degree angle to the drive shaft 32 and support the bottom of a boat. When power is applied to the drive system a to axially rotate the worm 2 in a first direction, the worm 2 frictionally engages the worm gear wheel 6, thereby turning the worm gear wheel 6, which rotates the drive shaft 32 and winds the cable 33 around the drive shaft 32 and thereby raises the boat. When power is applied to the drive system 1 to axially rotate the worm 2 in a second and opposite direction, the worm 2 frictionally engages the worm gear wheel 6, thereby turning the worm gear wheel 6, which rotates the drive shaft 32 and unwinds the cable 33 around the drive shaft 32 and thereby lowers the boat. Because the worm 2, worm gear wheel 6 and backplate 11 are composed of a high thermal conductivity material, when the friction produced by the frictional engagement of the worm 2 and worm gear wheel 6 causes heat to be generated, the heat is dissipated away from the area of contact between the worm 2 and the worm gear wheel 6, through the worm shaft 3 and bearing blocks 4 to the backplate 11. The drive shaft 32 may also be composed of a high thermal conductivity material and then the heat is also dissipated away from the area of contact between the worm 2 and the worm gear wheel 6, to the drive shaft 32.

What is claimed is:

1. A drive system for controlling the axial rotational motion of a drive shaft, comprising:
    a. a worm connected to a source of rotational power;
    b. the worm frictionally engages a worm gear wheel that axially rotates the drive shaft;
    c. the worm and worm gear wheel are connected to a backplate;
    d. means for maximizing the friction between the worm and worm gear wheel; and
    e. means for maximizing the transfer of heat generated by the frictional engagement of the worm and worm gear wheel away from the worm and worm gear wheel through the drive system, the means for maximizing the heat transferred away from the worm and worm gear wheel comprising:
        i. the backplate is composed of a material having a high thermal conductivity;
        ii. the worm gear wheel is composed of a material having a high thermal conductivity;
        iii. the worm gear wheel has a fixed hub about its center which connects directly to and rests in a recess formed in the backplate, thereby transferring heat to the backplate;
        iv. the worm comprises an axially rotatable worm shaft disposed within bearing blocks, with both the worm shaft and bearing blocks composed of a material having a high thermal conductivity and contacting each other directly so as to optimize heat transfer of the heat generated by the frictional engagement of the worm and worm gear wheel to the bearing blocks; and
        v. the bearing blocks are connected directly to and rest in a recess formed in the backplate, thereby transferring heat to the backplate.

2. A drive system for controlling the axial rotational motion of a drive shaft, according to claim 1, wherein the means for maximizing the friction between the worm and worm gear wheel is by increasing the ratio of the worm and worm gear wheel to at least 90:1.

3. A drive system for controlling the axial rotational motion of a drive shaft, according to claim 1, wherein the high thermal conductivity material of which the backplate is composed is aluminum.

4. A drive system for controlling the axial rotational motion of a drive shaft, according to claim 1, wherein the source of rotational power is a motor with a horsepower rating of between one-quarter horsepower and five horsepower.

5. A drive system for controlling the axial rotational motion of a drive shaft, comprising:
    a) a worm gear wheel comprising:
        (1) an axially rotatable circular disc having a rim, with means equally spaced about the rim for frictional engagement of a worm;
        (2) a connection at its center for receiving the drive shaft;
        (3) the rim of the worm gear wheel is located at a right angle to the drive shaft and is composed of a material having a high thermal conductivity;
    b) the worm comprising:
        (1) an axially rotatable worm shaft with at least one spiral groove about its center axis to form the worm of a depth sufficient to interlock with and frictionally engage the rim of the worm gear wheel:
        (2) the worm shaft being disposed within bearing blocks;
        (3) the worm shaft and bearing blocks are composed of a material having a high thermal conductivity and are contacting each other so as to optimize the dissipation of heat generated by the frictional engagement of the worm gear wheel and worm;
    c) a means for applying power to rotate the worm shaft, whereby the worm shaft then frictionally engages the worm gear wheel, causing the drive shaft to be rotated;
    d) the worm gear wheel and worm are removably connected directly to a backplate which is composed of a material having a high thermal conductivity;
    e) when power is applied to rotate the worm, it frictionally engages the worm gear wheel, and heat generated by that frictional engagement is transferred away from the worm gear wheel and worm to the backplate;
    f) the worm shaft is directly connected to the bearing blocks, thereby transferring heat, generated by the frictional engagement of the worm gear wheel and worm, away from the worm gear wheel and worm to the bearing blocks;
    g) the bearing blocks arc connected directly to and rest in a recess formed in the backplate; and
    h) the connection at the center of the worm gear wheel for receiving the drive shaft is a fixed hub which connects directly to, and rests in a recess formed in the backplate, thereby transferring heat, generated by the frictional engagement of the worm gear wheel and worm, away from the worm gear wheel and worm to the backplate.

6. A drive system for controlling the axial rotational motion of a drive, according to claim 5, wherein the worm shaft is a unitary piece so as to maximize the transfer of heat, generated by the frictional engagement of the worm gear wheel and worm, away from the worm gear wheel and worm to the bearing blocks and to the backplate.

7. A drive system for controlling the axial rotational motion of a drive shaft, according to claim 5, wherein the backplate assembly is an aluminum plate.

8. A drive system for controlling the axial rotational motion of a drive shaft, according to claim 7, wherein the aluminum plate of the backplate is of a thickness of about one-half inch.

9. A drive system for controlling the axial rotational motion of a drive shaft, according to claim 5, wherein the worm and bearing blocks are aluminum.

10. A drive system for controlling the axial rotational motion of a drive shaft, according to claim 5, wherein the spiral grooves of the worm shaft are bronze.

11. A drive system for controlling the axial rotational motion of a drive shaft, according to claim 5, wherein the worm gear wheel is steel.

12. A drive system according to claim 5, in combination with a drive shaft, wherein the drive shaft is connected to the worm gear wheel, the drive shaft being composed of a material having a high thermal conductivity so as to optimize the transfer of heat generated by the frictional engagement of the worm gear wheel and worm, away from the worm gear wheel and worm to the drive shaft.

13. A drive system for controlling the axial rotational motion of a drive shaft, according to claim 5, wherein:
   a. the means spaced about the rim of the worm gear wheel for frictional engagement of the worm are teeth that extend radially outward about the rim; and
   b. the grooves, about the center axis of the axially rotatable worm shaft form teeth that mesh with the teeth extending about the rim of the worm gear wheel.

14. A drive system for controlling the axial rotational motion of a drive shaft, according to claim 13, wherein the ratio of the teeth spaced about the rim of the worm gear wheel number to the spiral groove about the worm shaft is at least ninety to one.

15. A drive system according to claim 5, in combination with a lifting device, comprising:
   a. the backplate is attached to at least one support piling;
   b. a cable is affixed to a drive shaft, extending through a pulley connected to one end of at least two cradle beams that are located at a ninety degree angle to the drive shaft for supporting the bottom of a boat;
   c. when power is applied to the drive system to axially rotate the worm in a first direction, the worm frictionally engages the worm gear wheel, thereby turning the worm gear wheel which rotates the drive shaft and winds the cable around the drive shaft and thereby raises the boat;
   d. when power is applied to the drive system to axially rotate the worm in a second and opposite direction, the worm frictionally engages the worm gear wheel thereby turning the worm gear wheel which rotates the drive shaft and unwinds the cable from the drive shaft and thereby the boat is lowered; and
   c. when power is no longer applied to the drive system, the worm locks the worm gear wheel in place using frictional engagement ad stops the vertical movement of the boat, the frictional engagement being sufficient to prevent vertical movement of the boat.

16. A drive system for controlling the axial rotational motion of a drive shaft according to claim 5, further comprising a fitting for accepting a lubricant extending through a first surface of the circular disc of the worm gear wheel that faces away from the backplate.

17. A drive system for controlling the axial rotational motion of a drive shaft according to claim 5, wherein the direct connection of the worm gear wheel to the backplate is by a hub in the center of the worm gear wheel which connects to and rests in the recess formed in the backplate, the hub is retained in the backplate by means of a positive retention snap ring connected to the hub.

18. A drive system for controlling the axial rotational motion of a drive shaft according to claim 5, wherein the direct connection of the bearing blocks to the backplate is by means of fitting the bearing blocks into a recess of the same shape as the bearing blocks to provide a large surface connection for the transfer of heat directly to the backplate.

19. A drive system for controlling the axial rotational motion of a drive shaft, according to claim 5, wherein the worm gear wheel and bearing blocks fit into a recess in backplate which assures correct alignment of the drive system.

20. A drive system for controlling the axial rotational motion of a drive shaft, according to claim 5, wherein the spiral grooves are fastened directly to and secured to the axially rotatable worm shaft by a locking device.

21. A method of optimizing frictional engagement while maximizing heat dissipation in a drive system for controlling the axial rotational motion of a drive shaft, comprising the steps of:
   a. connecting a worm composed of a high thermal conductivity material to a source of rotational power;
   b. frictionally engaging the worm to a worm gear wheel, composed of a high thermal conductivity material, that axially rotates the drive shaft;
   c. connecting the worm and worm gear wheel to a backplate composed of a material having a high thermal conductivity;
   d. connecting the worm gear wheel having a fixed hub about its center directly to, and resting in a recess formed in the backplate, thereby transferring heat to the backplate;
   e. connecting the worm, which comprises an axially rotatable worm shaft connected to and disposed within bearing blocks, directly to the backplate by means of the bearing blocks that rest in a recess formed in the backplate;
   f. applying power to rotate the worm, whereby the worm then frictionally engages the worm gear wheel causing the drive shaft to be rotated, whereby the heat generated by the frictional engagement of the worm gear wheel and the worm is transferred to the backplate.

22. A method of optimizing frictional engagement while maximizing heat dissipation in a drive system for controlling the axial rotational motion of a drive shaft, according to claim 21, further comprising connecting the worm gear wheel to a drive shaft which is composed of a material having a high thermal conductivity and in the applying power step the heat generated is transferred to the drive shaft and the backplate.

* * * * *